United States Patent [19]

Masuzawa et al.

[11] Patent Number: 4,811,679

[45] Date of Patent: Mar. 14, 1989

[54] MARINE AUTOMATIC STEERING APPARATUS

[75] Inventors: Isao Masuzawa; Toshio Miyayama, both of Kuroiso; Mitsuo Nakayama, Itami; Koichi Nishimura, Yokohama, all of Japan

[73] Assignee: Kabushiki Kaisha Tokyo Keiki, Tokyo, Japan

[21] Appl. No.: 900,821

[22] Filed: Aug. 27, 1986

[30] Foreign Application Priority Data

Aug. 30, 1985 [JP] Japan .................. 60-191329

[51] Int. Cl.⁴ .................................. G05D 1/00
[52] U.S. Cl. ...................... 114/144 RE; 364/457
[58] Field of Search ............ 114/144, 144 RE, 144 E; 364/443, 444, 457; 33/316, 317 R, 318, 324–326, 356, 363 R

[56] References Cited

U.S. PATENT DOCUMENTS

| 3,693,575 | 9/1972 | Mades | 440/2 |
| 4,564,909 | 1/1986 | Kramer | 114/144 RE |
| 4,616,423 | 10/1986 | Shephard | 33/356 |

FOREIGN PATENT DOCUMENTS 0094898 5/1985 Japan .................. 114/144 E

Primary Examiner—Joseph F. Peters, Jr.
Assistant Examiner—Edwin L. Swinehart
Attorney, Agent, or Firm—Murray Schaffer

[57] ABSTRACT

A marine automatic steering apparatus for setting a desired course in a digital fashion is disclosed, in which a course deviation which is a difference between a set course and a ship's heading is indicated in an analog manner on a course deviation indicator whose zero point is set at the position corresponding to the lubber line of a steering repeater card.

11 Claims, 4 Drawing Sheets

MARINE AUTOMATIC STEERING APPARATUS

BACKGROUND OF THE INVENTION

1. Field of the Invention

The present invention relates generally to marine automatic steering apparatus and, more particularly, is directed to an automatic steering apparatus for ships provided with an indicator which indicates a course deviation for the aid of steering the ships.

2. Description of the Prior Art

FIG. 1A shows an example of a pilot head mechanism which is a main portion of a man-machine interface of a prior art marine automatic steering apparatus. This pilot head mechanism is disposed at the central portion of the panel of the marine automatic steering apparatus though not shown. FIG. 1B is a block diagram showing a system of the apparatus shown in FIG. 1A.

In FIGS. 1A and 1B, reference numeral 1 designates a course setting knob, reference numeral 2 designates a gear mechanism which is ganged with the course setting knob 1, and reference numeral 3 designates a needle or pointer which indicates the course set by the course setting knob 1 in cooperation with a repeater card which will be described later. Reference numeral 4 designates a set course delivered from the gear mechanism 2, and reference numeral 5 designates generally a course setting mechanism including the elements 1, 2 and 3 mentioned above. Reference numeral 6 designates a repeater motor, reference numeral 7 designates a gear which transmits the output of the repeater motor 6, reference numeral 8 designates a repeater card that is rotated by the gear 7, reference numeral 9 designates a lubber line, reference numeral 10 designates a ship's heading produced from the gear 7, and reference numeral 11 designates generally a steering repeater including the above mentioned respective elements 6, 7 and 8. Reference numeral 12 designates a difference between the set course 4 and the ship's heading 10, that is, a course deviation, and reference numeral 13 designates a course deviation mechanism which produces the above mentioned course deviation 12.

In the thus constructed prior art automatic steering apparatus, under the automatic steering mode for automatically keeping the ship's heading at a desired course, the main function and role are played by the pilot head mechanism which is formed of the course setting mechanism 5 in which the course setting pointer 3 is set at a desired azimuth scale through the gear 2 by rotating the course setting knob 1, the steering repeater 11 in which the rotation of the repeater motor 6 such as a step motor or a synchro motor driven by an azimuth sensor (not shown) such as a gyro compass and so on is transmitted through the gear 7 to the repeater card 8 such that the ship's heading signal 10 is indicated as the scale on the repeater card 8 coincident with the lubber line 9 fixed to the bow direction of the ship's hull and the course deviation mechanism 13 supplied with the set course 4 from the course setting mechanism 5 and the ship's heading 10 from the steering repeater 11 and which generates the difference therebetween, that is, the course deviation 12.

The above mentioned mechanisms 5, 11 and 13 are formed as mechanical types so that the assembly and the adjustment thereof are very difficult and troublesome. Of course, they are very expensive from a money standpoint and in addition, they are worn and have got more decrepits so that the maintenance thereof becomes cumbersome. Particularly, the decrepit mechanism considerably deteriorates the course keeping quality or ability on the automatic steering mode.

On the other hand, in the apparatus shown in FIG. 1, the scale of the repeater card 8 indicated by the lubber line 9 indicates the ship's heading, the scale of the repeater card 8 indicated by the pointer 3 indicates the set course and the difference between both the scales, that is, the angle between the pointer 3 and the lubber line 9 indicates the course deviation 12 so that the direction of the course deviation 12 and the magnitude thereof can be roughly understood at first sight.

When electronic technique, which is rapidly advanced recently, is utilized in order to solve the aforementioned problems, the above mentioned advantages of the prior art automatic steering apparatus are lost. In other words, if the desired course is set in a digital fashion and the ship's heading is digitally indicated by numerals, although the above mentioned complicated and expensive mechanisms become unnecessary, the magnitude of the course deviation can not be perceived immediately and the understanding of the automatic steering property and the checking of the yawing (yawing in the bow) become difficult. In order to carry out an automatic course change so as to change a desired course, when the set course is reset, the direction (polarity) of the course deviation can not be perceived immediately. This brings about the defect in the operation of the apparatus and the operator can not help but feel uneasiness and a burden psycologically. In addition, there is then a problem from a safety operation standpoint.

On the other hand, the indication system formed of the lubber line 9 of the steering repeater 11 and the repeater card 8 which can indicate the ship's heading immediately is excellent from a human engineering standpoint. Particularly in a manual steering mode in which the operator or helmsman steers a steering wheel, this indication system can not be omitted from a steering standpoint, while the digital indication system causes problems from operation and safety standpoint.

OBJECTS AND SUMMARY OF THE INVENTION

Accordingly, it is a general object of this invention to provide an improved automatic steering apparatus for ships.

It is an object of this invention to provide a marine automatic steering apparatus which can be manufactured at low cost and simplified in construction.

It is another object of this invention to provide a marine automatic steering apparatus which can be lightweighted.

It is still another object of this invention to provide a marine automatic steering apparatus which can be prevented from being deteriorated from maintenance and automatic steering ability standpoint.

It is further object of this invention to provide a marine automatic steering apparatus in which which direction and how much a ship's heading is deviated from a set course can be perceived immediately.

It is still further object of this invention to provide a marine automatic steering apparatus in which the automatic steering quality can be understood with ease and the situation of the yawing can be checked with ease.

It is yet further object of this invention to provide a marine auto-pilot apparatus which can help the helmsman to steer the ship very easily.

According to one aspect of the present invention, there is provided a marine automatic steering apparatus for setting a desired course in a digital fashion, in which a course deviation which is a difference between a set course and a ship's heading is indicated in an analog fashion on a course deviation indicator whose zero point is located at the position corresponding to a lubber line of a steering repearter card.

According to the above mentioned apparatus of the invention, the indication of the ship's heading is made by the repeater card system of the steering repeater. A desired course is set by a course setting device in a digital fashion while checking the indication of the numerical values indicated on a set course indicator. Then, the course deviation which is the difference between the set course and the ship's heading is indicated in the form of an analog amount by a course deviation indicator whose zero point is located at the position corresponding to the lubber line of the steering repeater card.

These and other objects, features and advantages of the present invention will become apparent from the following detailed description of the preferred embodiments taken in conjunction with the accompanying drawings, throughout which like reference numerals designate like elements and parts.

DESCRIPTION OF THE PREFERRED EMBODIMENTS

Now, an embodiment of a marine automatic steering apparatus according to this invention will be described hereinafter with reference to FIGS. 2A and 2B.

Figure 1A:
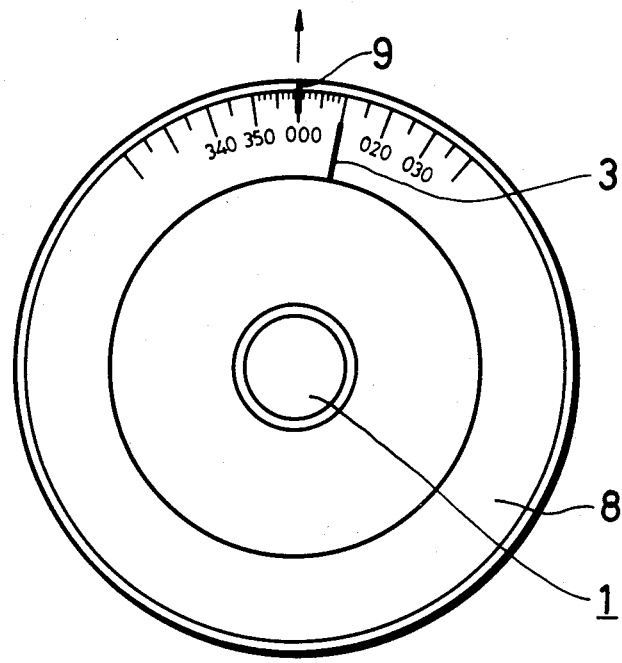
FIGS. 1A and 1B are a plan view and a block diagram respectively showing an example of a prior art pilot head mechanism and a system suction thereof.
Figure 1B:
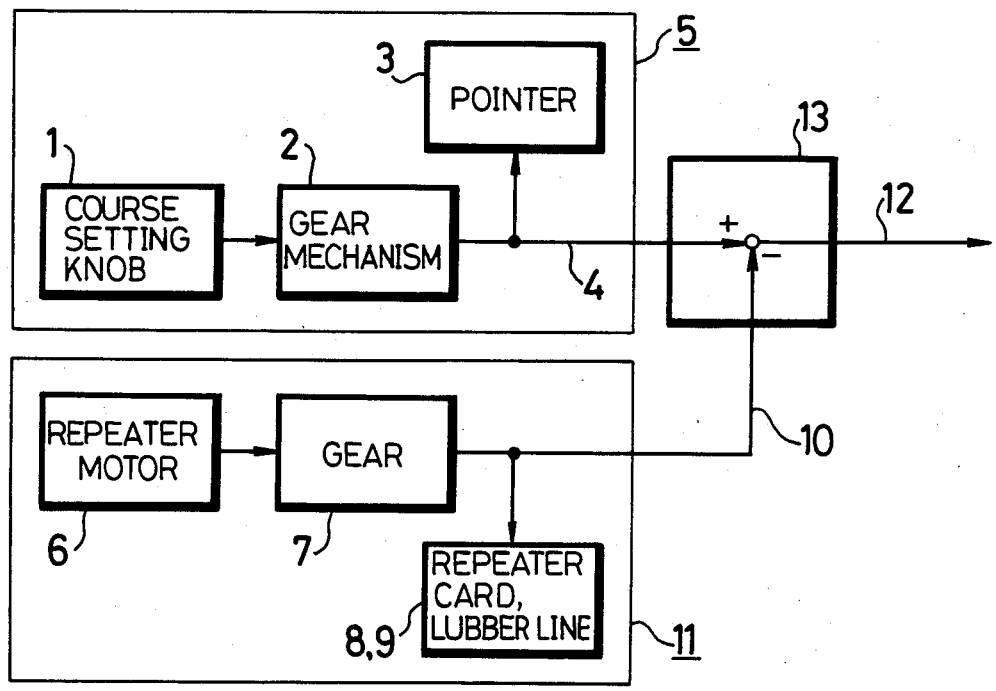
Figure 2A:
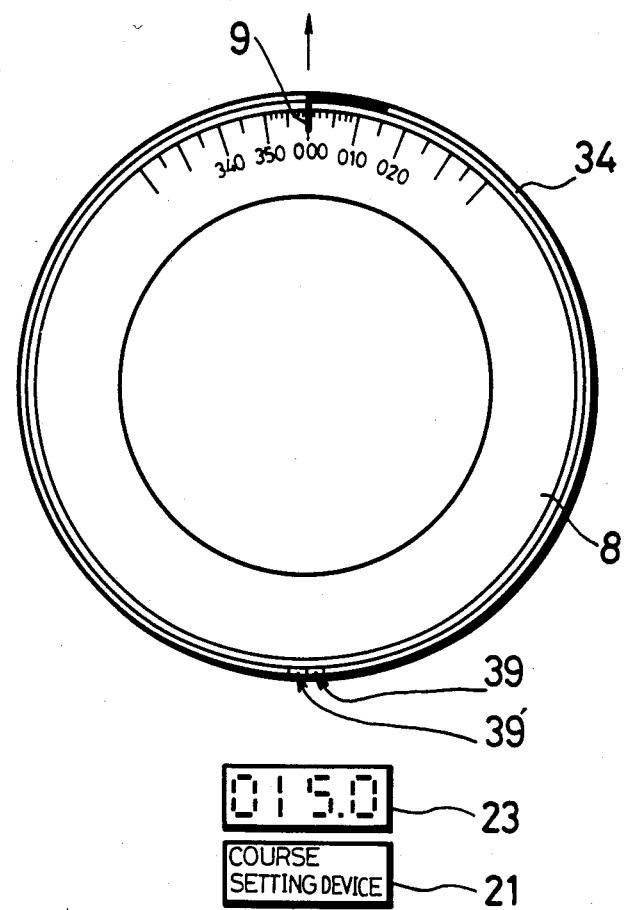
FIGS. 2A and 2B are a plan view and a block diagram respectively showing a pilot head mechanism and a system section thereof used in an embodiment of a marine automatic steering apparatus according to the present invention.

FIG. 2A illustrates one example of a pilot head mechanism which constructs a main portion of a man-machine interface of the marine automatic steering apparatus according to the present invention. This pilot head mechanism section is disposed at the central portion of the panel of the marine automatic steering apparatus of the invention though not shown. FIG. 2B is a block diagram showing the system section of the pilot head mechanism section shown in FIG. 2A. In FIGS. 2A and 2B, reference numeral 21 designates a course setting device, such as a switch button and so on, reference numeral 22 designates an interface coupled to the course setting device 21, reference numeral 23 designates a set course indicator which receives a set course signal 24 which is an output derived from the interface 22 and indicates the same as a set course, and reference numeral 25 designates generally a course setting circuit which includes the above mentioned elements 21, 22 and 23. Reference numeral 29 designates an interface circuit which is supplied with the ship's heading 10 from the steering repeater 11 and which then generates a ship's heading signal 30. Reference numeral 31 designates an adder which adds the set course signal 24 and the ship's heading signal 30. Reference numeral 32 designates a course deviation signal generated from the adder 31, and reference numeral 33 generally designates a course deviation calculation circuit which includes the elements 29 and 31. Reference numeral 34 designates a course deviation indicator which is supplied with the course deviation signal 32 and which indicates the corresponding course deviation. Reference numeral 35 designates an automatic steering control calculation section which receives the course deviation signal 32. Reference numeral 36 designates a steering wheel by which the ship is steered manually. Reference numeral 37 designates a steering mode selector by which the automatic steering mode or the manual or hand steering mode is selected. In this case, the steering repeater 11 is the same as that in the prior art example shown in FIG. 1B and it will not be described here.

According to the afore-mentioned embodiment of the invention, when the course setting device 21 which digitally sets a desired course is operated, the set course is indicated through the interface 22 to the set course indicator 23 in a digital fashion, that is, in the form of numerical values. On the other hand, the above mentioned set course signal 24 from the course setting circuit 25 and the ship's heading signal 30, which is an electronic signal provided by converting the ship's heading 10, which is the mechanical signal from the steering repeater 11 driven by a ship azimuth sensor (not shown) such as the gyro compass and the like and which indicates the ship's heading by the repeater card 8 and the lubber line 9 through the interface circuit 29, are both supplied to the adder 31 in which they are added so as to be the electronic course deviation signal 32. This course deviation signal 32 is supplied to the course deviation indicator 34 and thereby the course deviation is indicated on the indicator 34 in an analog fashion as shown in FIG. 2A by the bold line. The pilot head section is mainly composed of the course setting circuit 25, the steering repeater 11 and the course deviation calculation circuit 33. The electronic course deviation signal 32 from the course deviation calculation section 33 is transmitted to the automatic steering control calculation section 35.

In the automatic steering mode in which the steering mode selector 37 selects the side A, that is, the automatic steering calculation section 35, the control calculation for making the ship's heading coincident with the set course is carried out by this calculation section 35. The output from the calculation section 35 is supplied through the steering mode selector 37 to a power unit of the automatic steering apparatus or a steering engine or gear though not shown. Hence, the ship is steered by a predetermined amount.

Also in the manual or hand steering mode in which the side H of the steering mode selector 37 is selected, the course setting circuit 25, the steering repeater 11 and the course deviation calculation circuit 33 can function. Specifically, if the helmsman sets a desired course by using the course setting device 21, while checking the course deviation indicator 34 which indicates the course deviation in an analog fashion, the helmsman can steer the ship with ease such that the heading of the ship may coincide with the desired set course.

Subsequently, the course deviation indicator 34 which is the main feature of the embodiment of the invention shown in FIGS. 2A and 2B will be described below.

The course deviation indicator 34 has its zero point at the position corresponding to the lubber line 9 of the steering repeater 11 and is arranged to indicate the course deviation, which is the difference between the set course and the ship's heading, in the form of an analog amount. This course deviation indicator 34 is formed of a number of LEDs (light emission diodes) arranged around the outer peripheral portion of the repeater card 8 with an equal spacing in an annular shape. In this case, the LEDs on the indicator 34 are lit in the left or right direction from the zero point by a length (angle) corresponding to the value of the course deviation. On the basis of the direction (polarity) of the course deviation, the LEDs on the left-hand side from the lubber line 9 are colored in, for example, red, while the LEDs on the right-hand side from the lubber line 9 are colored in, for example, green and thus the directions of the course deviation can be discriminated with ease.

Course deviation excess indicators 39 and 39' are provided on the respective right and left ends of the course deviation indicator 34 extended from its zero point or at he positions near ±180° from the zero point which is the limit range in which the course can be changed by one operation, wherein when the helmsman changes the course with too large angle, the course deviation indicator 34 is lit and also the course deviation excess indicators 39 and 39' are lit so as to warn the helmsman on the excess steering. These indicators 39 and 39' are formed of, for example, LEDs and may indicate in, for example, red and green in response to the direction (polarity) of the course deviation.

According to the embodiment of the invention described in connection with FIGS. 2A and 2B, even when the desired course is set in a digital fashion, the course deviation is indicated on the course deviation indicator 34 in an analog fashion so that which direction and how much the ship's heading is deviated from the set course can be perceived and understood by the helmsman. The automatic steering property can be confirmed and the yawing can be checked with ease, thus achieving the effects from the operation and safety standpoint.

Further, since the course deviation excess indicators 39 and 39' are provided, the mis-operation of the helmsman can be warned. Furthermore, not only in the automatic steering mode but in the manual steering mode, the above mentioned course deviation indicator 34 and the course deviation excess indicators 39 and 39' have indication functions so that if the course instructed by a captain, a navigation officer and other is set by the course setting device 21, while seeing the course deviation indicated on the course deviation indicator 34 in an analog fashion which can be perceived immediately, a predetermined steering can be made at a proper timing. This is very useful as means for helping the steering of the ship.

Figure 2B:
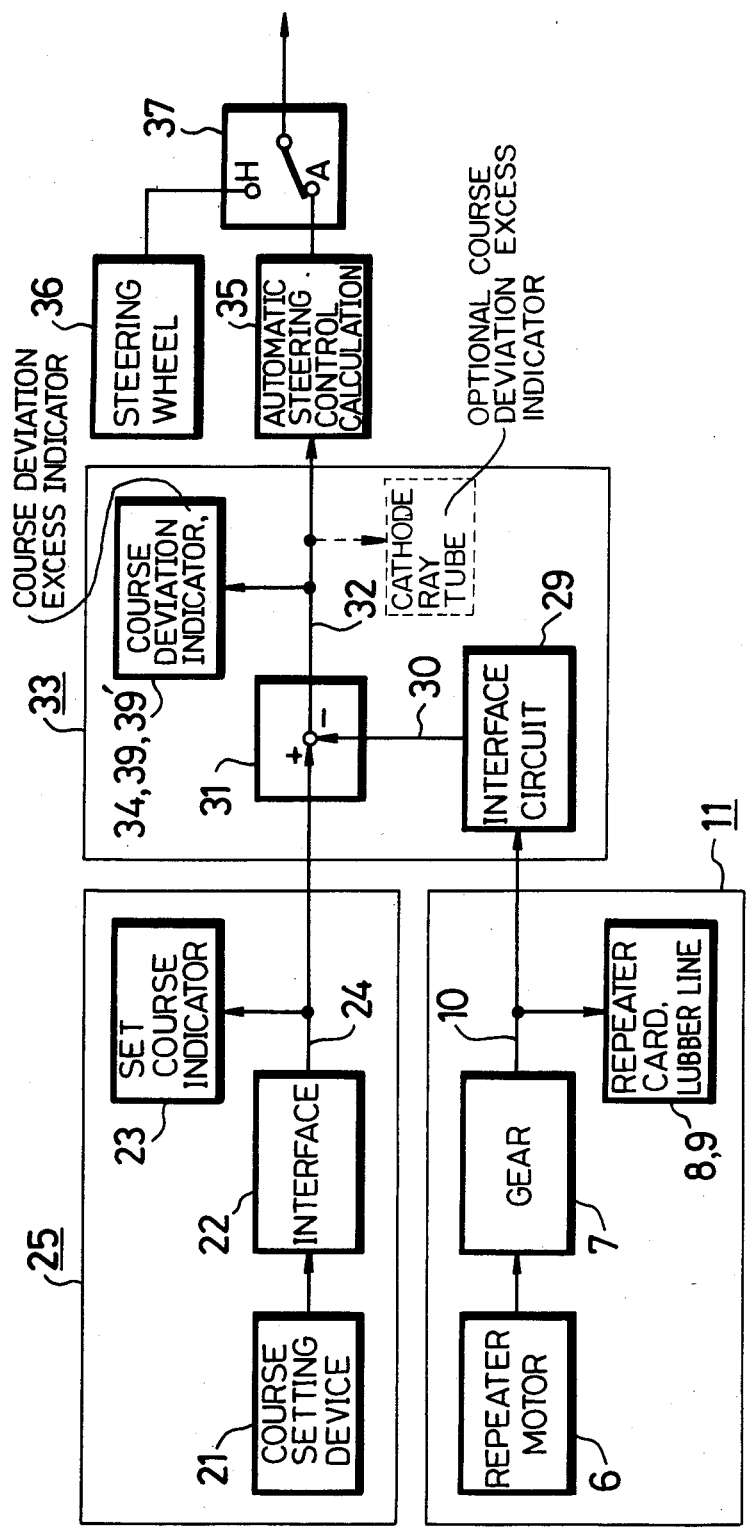

In the embodiment of the invention shown in FIGS. 2A and 2B, the course deviation indicator 34 is formed of many LEDs arranged in an annular shape with an equal spacing. Instead of the arrangement as described above, the LEDs are arranged so as to be capable of indication with the resolution of 1° to 2° in an indication range of the normal use, for example, ±30° and with the resolution of about 5° to 20° in the indication range higher than the above indication range, reducing the number of the assembly parts. Thus, the automatic steering apparatus can be manufactured at low cost. In this case, no trouble occurs in practice.

Further, such a course deviation indicator may be possible, in which the normal use range is indicated in an arc-shape. In this case, the course deviation excess indicator may indicate the occurrence of the course deviation more than the normal use range. The course deviation excess indicators 39 and 39' are provided at proper positions in the arc-shaped circumferential direction and arranged to have a function to indicate the occurrence of the excess course deviation caused by the trouble in the automatic steering mode and the automatic course change operation or manual course change operation of a large angle, thus providing the standard for steering the ship.

Furthermore, the course deviation indicator 34 and the course deviation excess indicators 39 and 39' are not limited to the arrangement of the LEDs but may be formed of LCD (liquid crystal displays) or the like.

Further, instead of the indication made by lighting the course deviation excess indicators 39 and 39', the indication may be made by blinking the indicators 39 and 39'.

In addition, the course setting circuit 25, the steering repeater 11 and the course deviation calculation circuit 33 except the course deviation indicator 34 are mere examples and the present invention can be applied to other systems.

Figure 3:
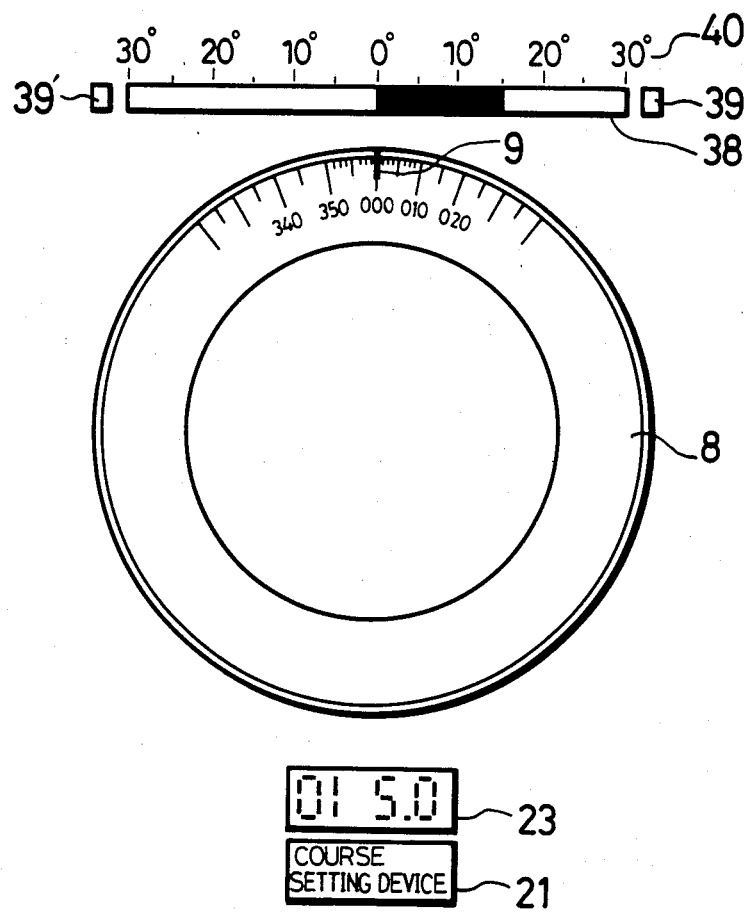
FIG. 3 is a plan view of a pilot head mechanism used in other embodiment of the marine automatic steering apparatus according to the present invention.

FIG. 3 shows another embodiment of the marine automatic steering apparatus according to this invention. In FIG. 3, reference numeral 38 denotes a course deviation indicator whose zero point is placed at the position corresponding to the lubber line 9 and which is extended in the right and left directions in a bar-shape. Reference numerals 39 and 39' denote course deviation excess indicators which are located at both ends of the extension of the course deviation indicator 38, respectively. Reference numeral 40 denotes a course deviation scale provided in association with the course deviation indicator 38 and which indicates the scale of the course deviation with an equal spacing. Other arrangements are exactly the same as those of the apparatus shown in FIGS. 2A and 2B.

In the embodiment shown in FIG. 3, the normal range of the course deviation (±30° in this embodiment) is indicated rectilineally from the zero position corresponding to the lubber line 9 to the right and left directions by the indicator 38. When the course deviation exceeds the normal range, the indication is made by the course deviation indicator 38 and the indication is made by the course deviation excess indicators 39 and 39', too.

It will be apparent that the embodiment shown in FIG. 3 can achieve the action and effect similar to those of FIGS. 2A and 2B. Also, the indicators 38, 39 and 39' and the scale 40 are simplified in construction so that the cost thereof can be reduced.

Figure 4:
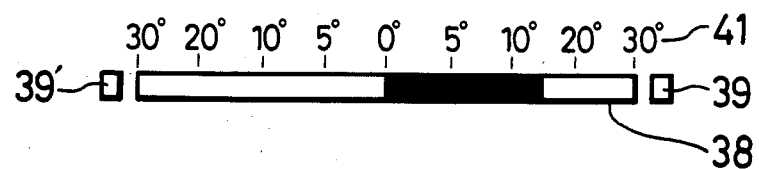
FIG. 4 is a plan view of a main portion of further embodiment of the marine automatic steering apparatus according to the present invention.

FIG. 4 is a schematic representation showing further embodiment of the marine automatic steering apparatus according to the present invention. In this embodiment, instead of the course deviation scale 40 with the equal spacing according to the embodiment shown in FIG. 3, there is utilized a scale 41 which can indicate a course deviation in an enlarged fashion within a small range (±10° in this embodiment). In accordance with the scale 41, the course keeping ability in the automatic steering mode and the manual steering mode can be checked with ease. As will be clear from FIG. 4, other arrangements are similar to those of the embodiment shown in FIGS. 2A and 2B and hence they will not be described.

According to the present invention as set forth above, since the complicated and expensive mechanisms, such as the prior art course setting mechanism 5 and the course deviation mechanism 13 are removed and these prior art mechanisms 5 and 13 are replaced by the electronic course setting circuit 25 and the course deviation calculation circuit 33, the marine automatic steering apparatus of the invention can be manufactured at low cost and reduced in weight. Also, the mechanism portions can be prevented from getting decrepit and the apparatus can be prevented from being deteriorated from maintenance and automatic steering ability standpoint. Although the desired course is set digitally by the course setting device 21, the course deviation is indicated by the course deviation indicator 34 or 38 in an analog fashion so that which direction and how much the ship's heading is deviated from the set course can be perceived immediately. Accordingly, the automatic steering ability can be understood with ease and the situation of the yawing can be checked with ease, removing the problems from operation and safety standpoint.

Further, also in the manual steering mode, the course deviation indicator can indicate the course deviation so that the desired course is set by the course setting device 21 and the predetermined steering of the ship can be made while checking the indication on the course deviation indicator 34 or 38. This contributes much to the help for the helmsman to steer the ship.

Furthermore, since the course deviation excess indicators 39 and 39' are provided, the mis-operation done by the helmsman can be warned or the steering standard can be made by the indication indicating that the course is changed with an excessively large angle.

Further, in the above embodiment of the present invention, there are independently provided the repeater card 8 with the lubber line 9, the set course indicator 23, the course deviation indicator 34 or 38, the course deviation excess indicators 39, 39' and so on. However, they can be illustrated on a graphic display made of, for example, a cathode ray tube as shown in FIG. 2B, LCD (liquid crystal display) or the like.

The above description is given on the preferred embodiments of the invention but it will be apparent that many modifications and variations could be effected by one skilled in the art without departing from the spirits or scope of the novel concepts of the invention so that the scope of the invention should be determined by the appended claims only.

We claim as our invention:

1. A marine automatic steering apparatus for setting a desired course in a digital fashion, comprising:

(a) course setting means for setting a desired course and for delivering a desired set course signal;
 (b) steering repeater means having a repeater card and a lubber line for delivering a ship's heading signal; and
 (c) a course deviation indicator located adjacent said repeater card and having a zero point at a position coincident with the lubber line of said steering repeater means for indicating, in analog fashion, a course deviation between said desired set course signal and said ship's heading signal, said course deviation being indicated on one or the other side of said zero point.

2. A marine automatic steering apparatus according to claim 1, in which said course deviation indicator is a bar-shaped indicator extended in the right and left directions from said zero point up to a desired range in which the indication is possible.

3. A marine automatic steering apparatus according to claim 1, in which said course deviation indicator is an indicator which is formed by arranging indication elements around an outer periphery of said repeater card in an annular shape.

4. A marine automatic steering apparatus according to claim 2, in which said course deviation indicator has a scale which can indicate in an enlarged form a course deviation which is small in range and is frequently used in the normal operation.

5. A marine automatic steering apparatus according to claim 3, in which said course deviation indicator indicates a course deviation by using also a scale on said repeater card.

6. A marine automatic steering apparatus according to claim 3, in which said course deviation indicator indicates a course deviation within a desired range fully and a course deviation in a range more than said desired range roughly.

7. A marine automatic steering apparatus according to claim 3, in which said course deviation indicator is an arc-shaped indicator which indicates a course deviation only on an annular predetermined range.

8. A marine automatic steering apparatus according to claim 1, in which said course deviation indicator indicates the left-hand side of the lubber line of said repeater card in red and the right-hand side thereof in green.

9. A marine automatic steering apparatus according to claim 1 further comprising a course deviation excess indicator at both ends of said course deviation indicator for indicating an excess course deviation.

10. A marine automatic steering apparatus as claimed in claim 1, in which said course deviation indicator is formed of a cathode ray tube on which said course deviation is indicated in analog fashion.

11. A marine automatic steering apparatus according to claim 10, further comprising a course deviation excess indicator for indicating an excess course deviation and the excess course deviation is indicated on said cathode ray tube.

* * * * *